United States Patent [19]

Sasaki et al.

[11] 4,383,275
[45] May 10, 1983

[54] READ-OUT LEVEL COMPENSATION IN AN OPTICAL READER SYSTEM

[75] Inventors: Hiromu Sasaki, Yamatokoriyama; Nobuo Nakamura, Osaka; Humikazu Nagano, Yamatokoriyama, all of Japan

[73] Assignee: Sharp Kabushiki Kaisha, Osaka, Japan

[21] Appl. No.: 191,084

[22] Filed: Sep. 26, 1980

[30] Foreign Application Priority Data

Sep. 29, 1979 [JP] Japan .............................. 54-127117

[51] Int. Cl.$^3$ .............................................. H04N 1/40
[52] U.S. Cl. .......................... 358/280; 340/146.3 AG; 358/282; 382/65
[58] Field of Search ....................... 358/280, 282, 163; 340/146.3 AG; 235/455

[56] References Cited

U.S. PATENT DOCUMENTS

| | | | |
|---|---|---|---|
| 3,800,078 | 3/1974 | Cochran et al. | 340/146.3 AG |
| 3,962,681 | 6/1976 | Requa et al. | 340/146.3 AG |
| 4,070,696 | 1/1978 | Mitchell | 358/280 |
| 4,129,853 | 12/1978 | Althauser et al. | 358/282 |
| 4,216,503 | 8/1980 | Wiggins | 358/280 |
| 4,228,468 | 10/1980 | Nagano et al. | 358/282 |
| 4,240,103 | 12/1980 | Poetsch et al. | 358/163 |

OTHER PUBLICATIONS

Poetsch-A Continuous-Motion Color Film Telecine Using CCD Line Sensors, SMPTE Jour.-vol. 87, #12--Dec. 1978, pp. 815-820.

Primary Examiner—Joseph A. Orsino, Jr.
Attorney, Agent, or Firm—Birch, Stewart, Kolasch & Birch

[57] ABSTRACT

An optical reader system includes a plurality of sensor elements for providing a picture signal. Before initiating an actual reading operation, a white background plate is scanned to obtain reference information. The white background plate data is reversed to obtain a reciprocal of the white level and the thus obtained reciprocal is memorized in a memory. In an actual reading operation, the picture signal derived from the sensor elements is multiplied by the reciprocal memorized in the memory to compensate for the nonuniformity of the sensor outputs.

8 Claims, 5 Drawing Figures

FIG. 1

READ-OUT LEVEL COMPENSATION IN AN OPTICAL READER SYSTEM

BACKGROUND AND SUMMARY OF THE INVENTION

The present invention relates to an optical reader system such as a facsimile transmitter and, more particularly, to a read-out level compensation system in an optical reader system.

It is very difficult in an optical reader system to obtain a uniform output because a video signal derived from sensor outputs inevitably includes variations due to the following reasons.

(1) The light source, usually a fluorescent lamp, includes variations in its brightness distribution.
(2) A lens is necessarily required in the optical reader system and, therefore, the shading effect is unavoidably generated at the periphery of the lens.
(3) The sensitivity of the sensor elements can not be uniform.

The above problems (1) and (2) can be minimized mechanically. However, it requires a long time period to adjust the system in a preferred condition. If the above problem (3) is desired to be removed, manufacturing cost of the sensor elements becomes considerably high.

Accordingly, an object of the present invention is to provide an optical reader system which ensures an accurate operation.

Another object of the present invention is to provide a read-out level compensation system in a facsimile transmitter system.

Still another object of the present invention is to provide a read-out level compensation system which uniforms an output signal derived from sensor elements in an optical reader system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an optical reader system is constructed to first read out the white background to obtain a reference output. The reference output is reversed and memorized in a memory. The actual sensor output derived from an original sheet is multiplied by the memorized, reversed reference output to get a compensated video signal.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
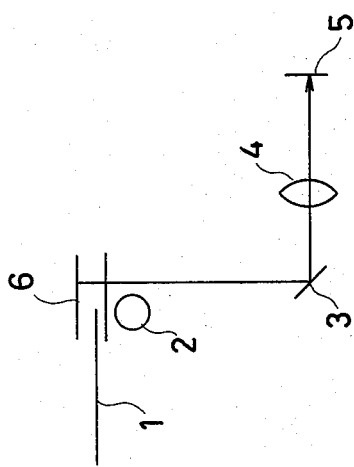
FIG. 1 is a schematic sectional view of an optical system employed in an embodiment of an optical reader system of the present invention.

FIG. 1 schematically shows an optical system employed in an embodiment of an optical reader system of the present invention. An original sheet 1 is driven to travel through an optical reader system which comprises a light source 2, for example, a fluorescent lamp for illuminating the original sheet 1. The light reflected and scattered at the original surface is introduced into sensors 5, which include charge-coupled-device sensors, through a mirror 3 and a lens 4. The light strength is converted into an electric signal by the sensors 5. A white background plate 6 is disposed at the reading section. The white level of the white background plate 6 is read out when the original sheet 1 does not appear at the reading section to produce a signal which is required for compensating for the sensor output variations.

Figure 2:
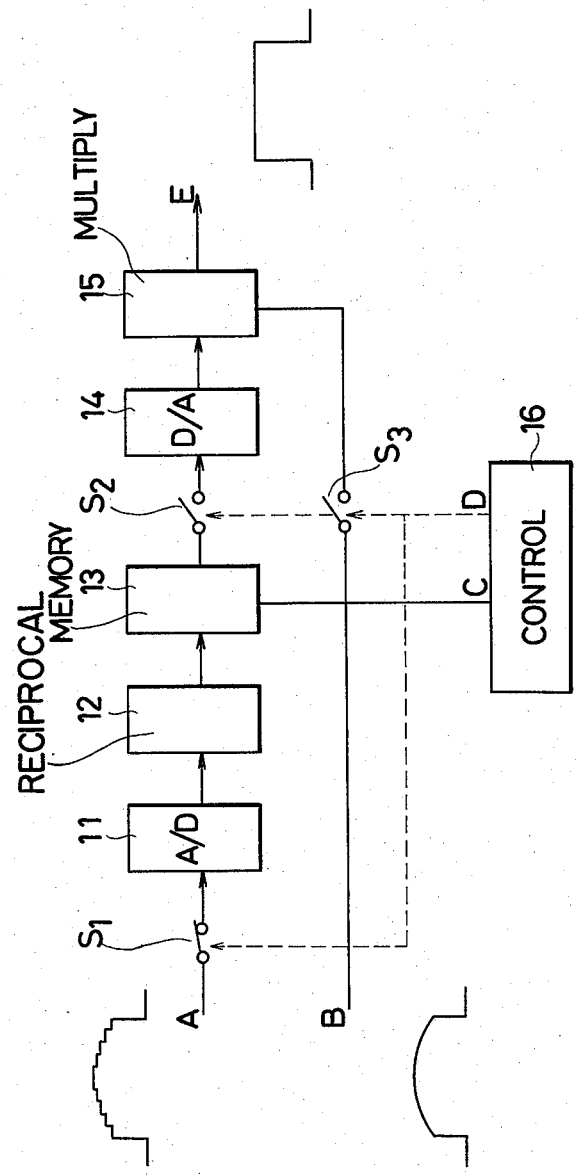
FIG. 2 is a schematic block diagram of an embodiment of an optical reader system of the present invention.

FIG. 2 schematically shows an embodiment of an optical reader system of the present invention. The optical reader system includes a plurality of sensors aligned in a line. If each of the output signals derived from each sensor in the sensor alley is compensated one by one, the circuit construction is very complicated. Moreover, the optical condition is similar to each other when the adjacent two sensors are compared. Therefore, it is proposed to conduct the compensation operation block by block, each block comprising 2n (for example, 32) sensor elements. That is, the compensation value for each block is obtained by averaging 32 output signals derived from the sensor elements included in one block. A typical construction of the above-mentioned block averaging system is described U.S. Pat. No. 4,228,468 entitled "OUTPUT CORRECTING SYSTEM FOR FACSIMILE", issued on Oct. 14, 1980 to Humikazu Nagano, Hiromu Sasaki and Syoichi Yasuda, and assigned to the same assignee as the present application.

In FIG. 2, B represents an output picture signal derived from the sensors 5, A represents a modified signal which is obtained by averaging output signals derived from 32 sensors 5, C is a read/write control signal, D is a switching signal for controlling a memorizing operation of the white background level and for controlling a multiplication operation for obtaining a compensated video signal, and E represents the compensated video signal. The optical reader system of the present invention comprises an analog-to-digital converter 11, a reverse converter 12 for obtaining a reciprocal, a memory 13 of $(2048/2n) \times 4$ bit capacity, a digital-to-analog converter 14, a multiplier 15, and a controller 16.

As already discussed above, the white background plate level is first read out before initiating the actual reading operation. The controller 16 develops the switching signal D of a logic "1" to turn ON a first switch $S_1$ to introduce the modified average signal A, and to turn OFF second and third switches $S_2$ and $S_3$ which are positioned between the memory 13 and the digital-to-analog converter 14, and to introduce the output picture signal B into the multiplier 15, respectively. The modified average signal A of the 32 bit unit is introduced into the analog-to-digital converter 11 to obtain a digital data indicative of the white level of the background plate 6. The digital data is applied to the reverse converter 32 to get the reciprocal. The thus obtained reciprocal of the white background level is introduced into and stored in the memory 13 which is held in the write mode by the control signal C.

When the reciprocal is memorized in the memory 13, the controller 16 changes the control signal C to place the memory 13 in the read mode. The switching signal D bears a logic "0" to turn OFF the first switch $S_1$, and to turn ON the second and third switches $S_2$ and $S_3$. The original sheet feeding system is energized to conduct the actual reading operation. The reciprocal memorized in the memory 13 is introduced into the digital-to-analog converter 14, and the analog signal is applied to the multiplier 15, the reciprocal functioning as the multiplier. The multiplier 15 also receives, as the multiplicand, the output picture signal B derived from the sensors 5 to provide the compensated video signal E.

The above discussed multiplier input and the multiplicand input are synchronized for each line. The multiplicand, the output picture signal B, shows the shading effect, wherein the output level becomes small at both ends of the line output. However, the multiplier, the reciprocal of the modified average signal A, shows a higher level at the both ends of the line output. Accordingly, the output signal of the multiplier 15, the compensated video signal E, shows desirable uniform characteristics. In the circuit of FIG. 2, the analog-to-digital converter 11 and the reverse converter 12 can be on the same IC chip as the digital-to-analog converter 14 and the multiplier 15, which functions in either way in response to the switching operation of the switching signal D.

Figure 3:
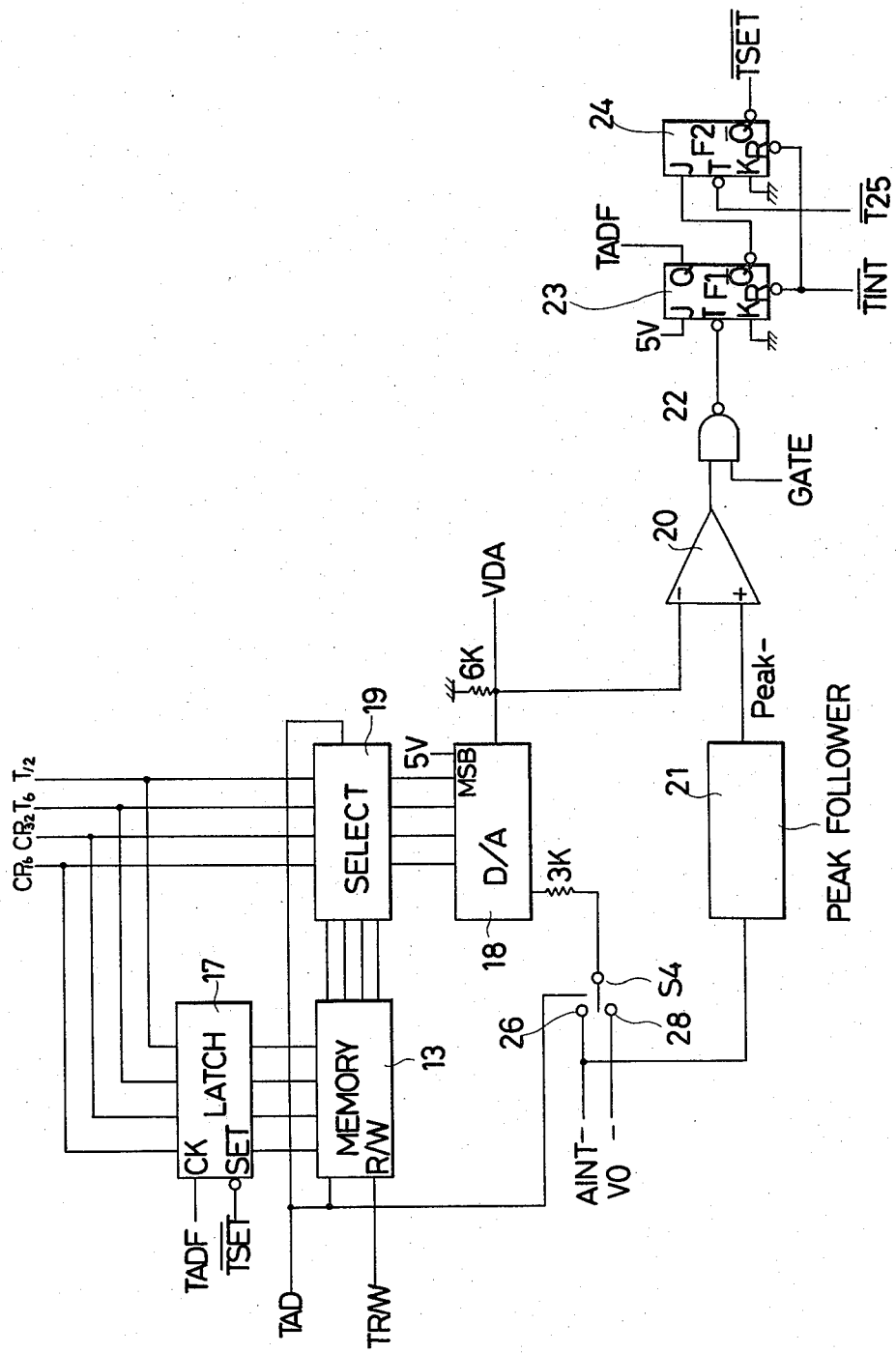
FIG. 3 is a block diagram of an essential part of the optical reader system of FIG. 2.

FIG. 3 shows an essential part of the optical reader system of FIG. 2. Like elements corresponding to those of FIG. 2 are indicated by like numerals.

A latch circuit 17 is connected to the memory 13, which temporarily stores a count output ($CP_{16}CP_{32}T_6T_{12}$), which is a four bit data signal representing the white level of the background plate 6, derived from a counter included in the controller 16. A selector 19 is connected to the memory 13 for selectively supplying a digital-to-analog converter 18 with the memorized data stored in the memory 13 or a count output, which represents the data, derived from the counter included in the controller 16. The digital-to-analog converter 18 functions as the analog-to-digital converter 11, the reverse converter 12, the digital-to-analog converter 14 and the multiplier 15 of FIG. 2. More specifically, the digital-to-analog converter 18 receives a picture signal $V_0$ through a selection switch $S_4$. The thus introduced picture signal $V_0$ is multiplied by a signal applied through the selector 19 to form a compensated output signal $V_{DA}$. The compensated output signal $V_{DA}$ is applied to the image reproduction circuit and to one input terminal of a comparator 20. The other input terminal of the comparator 20 is connected to receive an output signal of a peak-follower circuit 21. The comparison result of the comparator 20 is applied to a NAND gate 22. The NAND gate 22 receives a gate signal GATE and develops an output signal toward a T-input terminal of a flip-flop 23. The flip-flop 23 develops a first control signal $T_{ADF}$, and the following flip-flop 24 develops a second control signal $T_{SET}$, the two control signals being applied to the latch circuit 17. A switching signal $T_{AD}$ is developed from the controller 16, and bears the logic "1" when the white background level is desired to be memorized in the memory 13, and the logic "0" at the actual reading operation.

An operation mode of the optical reader system of FIG. 3 will be described with reference to FIG. 4.

Before initiating the actual reading operation, the white background plate 6 is scanned to memorize the white level in the memory 13. More specifically, the switching signal $T_{AD}$ derived from the controller 16 bears the logic "1", and the memory 13 is placed in the write mode through the use of a read/write control signal $T_{R/W}$. The selector 19 is placed in a condition, by the switching signal $T_{AD}$, to apply the counter output $CP_{16}CP_{32}T_6T_{12}$ to the digital-to-analog converter 18 as a data input. The selection switch $S_4$ is inclined to a first terminal 26, whereby an average white level signal $A_{INT}$ of 32 sensor elements is applied to a reference input terminal of the digital-to-analog converter 18. The above discussed counter output $CP_{16}CP_{32}T_6T_{12}$ is a four bit data signal of a succeeding pulse train counting up to 16 degrees. That is, the pulse $T_{12}$ has a period of t seconds. The pulse $T_6$ has a period of t/2 seconds, the pulse $CP_{32}$ has a period of t/4 seconds, and $CP_{16}$ has a period of t/8 seconds.

In the white level memorizing mode, the peak-follower circuit 21 functions to hold the maximum value of the average white level signal $A_{INT}$, which is applied to the positive input terminal of the comparator 20. The negative input terminal of the comparator 20 receives the output signal $V_{DA}$ derived from the digital-to-analog converter 18. In FIG. 4, the average white level signal $A_{INT}$ is shown by the solid line, the output signal $V_{DA}$ is shown by the broken line, and the maximum value signal "Peak", which is derived from the peak-follower circuit 21, is shown by the chain line. The average value obtained at the 32 sensor element average period P is held during the white level detection period Q. Sections (I), (II), and (III) of the white level detection period Q show the detected white level for, for example, the first, third and fifth blocks, respectively, each block comprising 32 sensor elements.

The respective sections (I), (II) and (III) show the following conditions.

(I) The average white level signal $A_{INT}$ bears a half level of the maximum value signal "Peak".

(II) The average white level signal $A_{INT}$ bears the level identical with the maximum value signal "Peak".

(III) The average white level signal $A_{INT}$ does not reach the half of the maximum value signal "Peak".

The digital-to-analog converter 18 includes the multiplier which functions to double the reference input signal. Moreover, the accuracy of the digital-to-analog converter 18 is doubled when the MSB (most significant bit) terminal is held at the logic "1". For example, when the detected average white level signal $A_{INT}$ has a half level of the maximum value signal "Peak", the output signal $V_{DA}$ swings between the half level and the "Peak" value in accordance with the counter output ($CP_{16}CP_{32}T_6T_{12}$).

Figure 4:
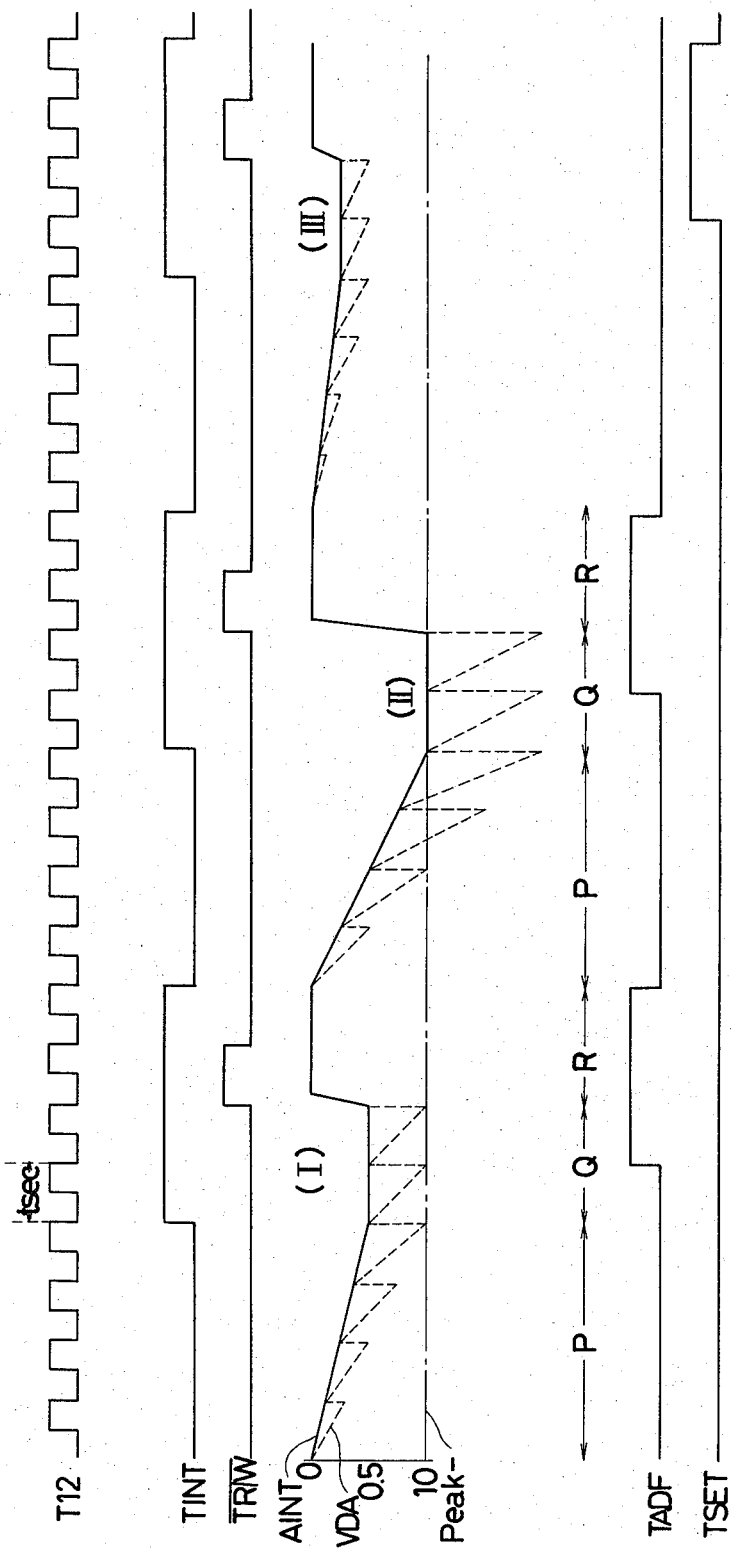
FIG. 4 is a time chart showing various signals occurring within the optical reader system of FIG. 3.

In the example shown in FIG. 4, regarding the first block (I), the output signal $V_{DA}$ becomes identical with the maximum value signal "Peak" when the counter output is "1111". The comparator 20 develops a detection output to enable the flip-flop 23, whereby the first control signal $T_{ADF}$ is developed. In response to the leading edge of the first control signal $T_{ADF}$, the counter output "1111" is introduced into the latch circuit 17, and the thus introduced counter output "1111" is written into the memory 13 during the next appearing "Low" level period of the read/write control signal $T_{R/W}$. With respect to the third block (II), the latching operation is conducted when the counter output is "0000". The data "0000" is written into the memory 13. Regarding the fifth block (III), the output signal $V_{DA}$ never reaches the maximum value signal "Peak" and, therefore, the comparator 20 does not develop the detection output. In this condition, the flip-flop 24 operates to develop the second control signal $T_{SET}$ for latching the counter output "1111" in the latch circuit 17. The latched counter output "1111" is written into the memory 13 at the next appearing "Low" level period of the read/write control signal $T_{R/W}$.

The output signals of the 32 sensor elements included in a specific one block are averaged at the 32 sensor element average period P. The thus obtained data is written into the memory 13 through the use of the white level detection period Q and a memory write period R. Accordingly, the sensor block next to the specific one block is not subject to the averaging operation at this moment. The block addressing signal for selecting the sensor block (including 32 elements) which should be averaged is a timing signal $T_{INT}$ derived from the controller 16. The averaging operation is conducted while the timing signal $T_{INT}$ bears the logic "0". The timing signal $T_{INT}$ is constructed to reverse the logic relation at every one line scan timing and, therefore, the averaging operation of the entire sensor element blocks (64 blocks when the entire sensor elements are 2048) is completed by two line scanning operations. For example, at the first scanning operation, the odd number blocks are averaged, and the even number blocks are averaged at the second scanning operation. More specifically, the average white level signals $A_{INT}$ of the white background picture signals $V_0$ of the 32 odd number sensor blocks, each block comprising the sensor elements 1 through 31, 64 through 95, . . . , and 1984 through 2015, are obtained at the first scanning operation. And, the reciprocals of the average white level signals $A_{INT}$ are written into the memory addresses, 2, 4, 6, . . . , 64 of the memory 13, respectively. At the second scanning operation, picture signals $V_0$ derived from the sensor elements 32 through 63, 94 through 127, . . . , and 2016 through 2048 are averaged block by block. And, the 32 reciprocals of the 32 average white level signals $A_{INT}$ are written into the memory addresses 3, 5, 7, . . . , 65 of the memory 13, respectively.

Figure 5:
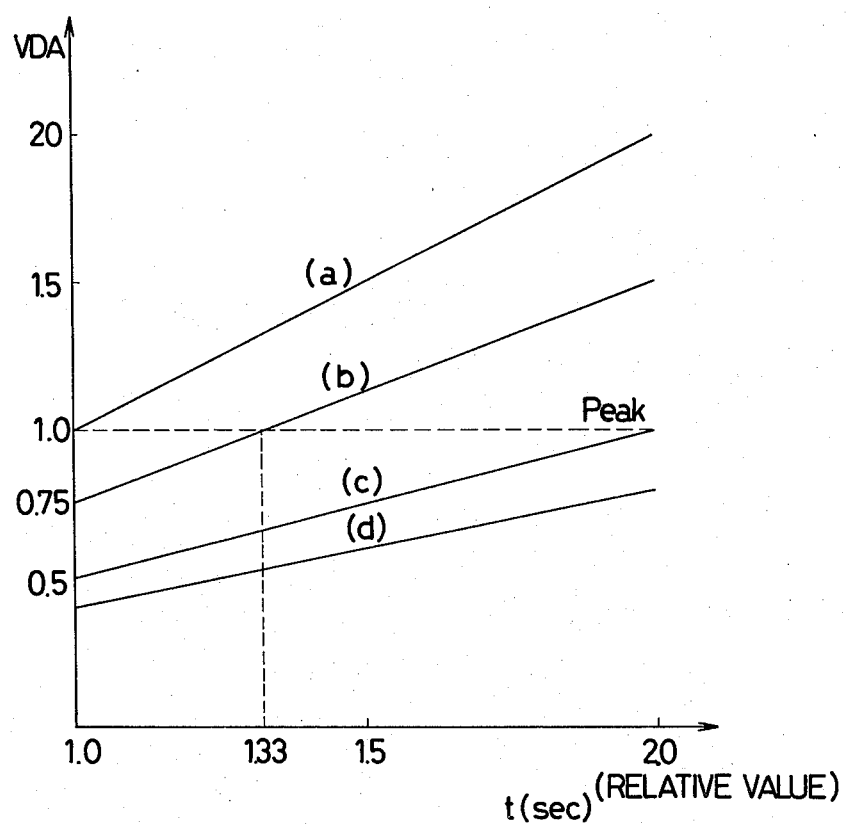
FIG. 5 is a graph for explaining operation modes of the optical reader system of FIG. 3.

FIG. 5 shows relationships between the average white level signal $A_{INT}$, the converter output signal $V_{DA}$, and the maximum value signal "Peak" in the white level detection period Q. When the maximum value signal "Peak" is 1.0, and the average white level signal $A_{INT}$ is 0.5, namely, a half of the maximum value signal "Peak", the converter output signal $V_{DA}$ increases from 1.0 to 2.0 during a period of 0 through t seconds. This is because the output is a doubled value of the reference input signal, and the MSB terminal of the digital-to-analog converter 18 is held at the logic "1".

In an example (a) of FIG. 5, the average white level signal $A_{INT}$ crosses the maximum value signal "Peak" at the counter output "0000" and, therefore, the data "0000" is written into the memory 13. If the relative value of "0000" is selected at 1.0, the relative value for an example (b) is 1.33. And the relative value for an example (c) is 2.0. The reciprocal of the average white level signal $A_{INT}$ is written into the memory 13 in the relative value notation. In an example (d), the average white level signal $A_{INT}$ never cross the maximum value signal "Peak" and, therefore, the relative value 2.0 (the counter output is "1111") is forced to be written into the memory 13.

After completion of the white level memorizing operation, the actual reading operations is conducted. The switching signal $T_{AD}$ derived from the controller 16 bears the logic "0" to place the memory 13 in the reading mode. The selector 19 is placed in a condition to apply the memory output derived from the memory 13 to the digital-to-analog converter. The switching signal $T_{AD}$ functions to incline the selection switch $S_4$ toward a second terminal 28, whereby the picture signal $V_0$ is applied to the reference input terminal of the digital-to-analog converter 18. As already discussed above, the digital-to-analog converter 18 includes the multiplier function. Accordingly, the digital-to-analog converter 18 develops the compensated output signal $V_{DA}$ which is the product of the picture signal $V_0$ now reproduced, and the memorized, reciprocal of the white background level which has been stored in the memory 13. In this way, the uniform video signal is obtained.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical reader system comprising:
   a light source for illuminating an original sheet and a reference sheet;
   a plurality of sensor elements for detecting the light reflected at the surface of said original sheet and developing first output signals in response thereto, said sensor elements detecting the light reflected at the surface of said reference sheet and developing second output signals in response thereto;
   means for developing a picture signal in accordance with the first output signals derived from said plurality of sensor elements; and
   compensation means for performing a compensation operation on said picture signal thereby producing a compensated picture signal, said compensation means including;
   memory means for storing a reciprocal of the second output signals from said sensor elements in digital form therein; and
   analog-to-digital converter means connected to said sensor elements for receiving the second output signals from said sensor elements and developing digital second output signals in response thereto;
   reverse converter means for receiving the digital second output signals from said analog-to-digital converter means and developing a reciprocal of said digital second output signals in a digital form in response thereto, the reciprocal of said digital second output signals being presented to said memory means for storage therein when said optical reader system operates in said write mode;
   write means for introducing said reciprocal of said digital second output signals from said reverse converter means into said memory means when said optical reader system operates in said write mode;

read means for developing said reciprocal of said digital second output signals from said memory means, digital-to-analog converter means for converting the reciprocal of said digital second output signals from said read means when said optical reader system operates in said read mode and for developing reciprocal analog second output signals in response thereto;

multiplier means for multiplying the reciprocal analog second output signals from said digital-to-analog converter means by said picture signal thereby producing said compensated picture signal;

switching means for connecting said write means to said memory means when said sensor elements scan said reference sheet, and for connecting said read means to said memory means when said sensor elements scan said original sheet, controller means connected to said memory means and including said write means and said read means for controlling said optical reader system to operate in said write mode and in said read mode to introduce said reciprocal into said memory means and to develop said reciprocal from said memory means, respectively;

peak follower circuit means responsive to the output signals from said sensor elements for developing a peak output signal representative of the peak value of said output signals;

comparator means responsive to said peak output signal and to said compensated picture signal for developing an output signal when the peak output signal is greater than or equal to said compensated picture signal;

control signal generation means responsive to the output signal of said comparator for generating a first control signal and a second control signal, said control signal generation means including first and second control signal generating means, said first control signal generating means generating said first control signal when said output signal is generated twice in succession by said comparator means, said second control signal generating means generating said second control signal in response to the absence of said output signal for a predetermined time; and latch circuit means connected between said controller means and said memory means and responsive to said first and second control signals from the means for generating for storing an output signal from said controller means therein and for permitting said output signal from said controller means to enable said memory means in response to said first control signal and for preventing said output signal from said controller means for energizing said memory means in response to said second control signal.

2. An optical reader system in accordance with claim 1 wherein a single integrated circuit chip includes said analog-to-digital converter means, said reverse converter means, said digital-to-analog converter means, and said multiplier means.

3. An optical system in accordance with claim 1, further comprising selector circuit means connected to said memory means, to said controller means and to said converter means and responsive to an output signal from said controller means for connecting said controller means to said converter means in response to a first value of said output signal from said controller means thereby permitting further output signals to pass therebetween and for connecting said memory means to said converter means in response to a second value of said output signal from said controller means, thereby permitting the contents of said memory means to transfer to said converter means.

4. The optical reader system of claim 1 wherein:
said plurality of sensor elements are classified into a predetermined number of blocks,
the output signals derived from said sensor elements included in each block being averaged,
said reciprocal of said digital second output signals being formed through the use of the average output signals.

5. The optical reader system of claim 4, wherein each block includes thirty-two sensor elements.

6. The optical reader system of claim 4, wherein said light source comprises a fluorescent lamp.

7. The optical reader system of claim 4, wherein said plurality of sensor elements comprise a plurality of charge-coupled-devices aligned in a line.

8. The optical reader system of claim 4, further comprising a lens for introducing said light reflected at the surface of said original sheet to said plurality of sensor elements.

* * * * *